July 6, 1943.        K. A. WILLARD        2,323,506
MINIATURE AIRPLANE
Filed Feb. 9, 1942
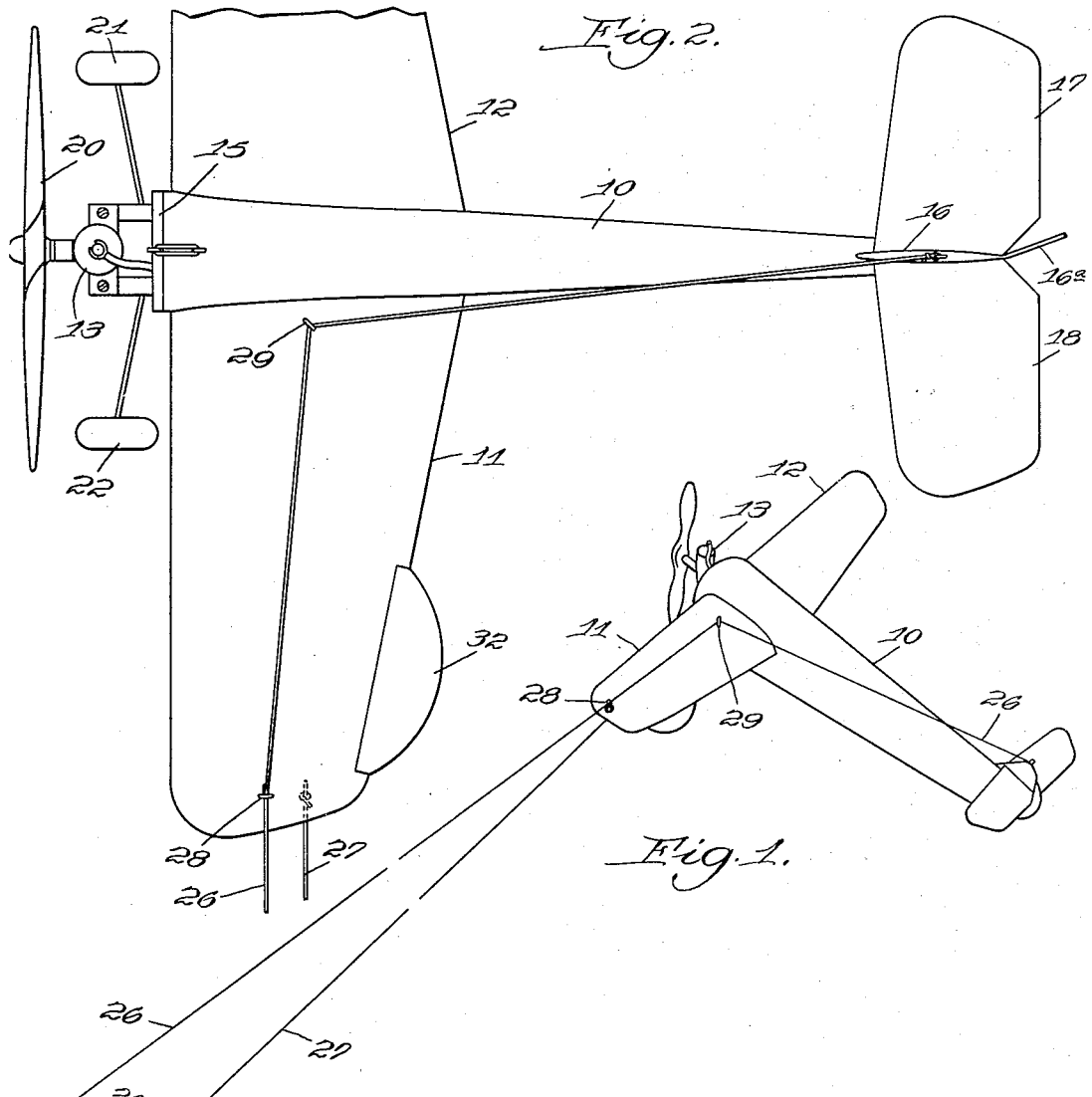
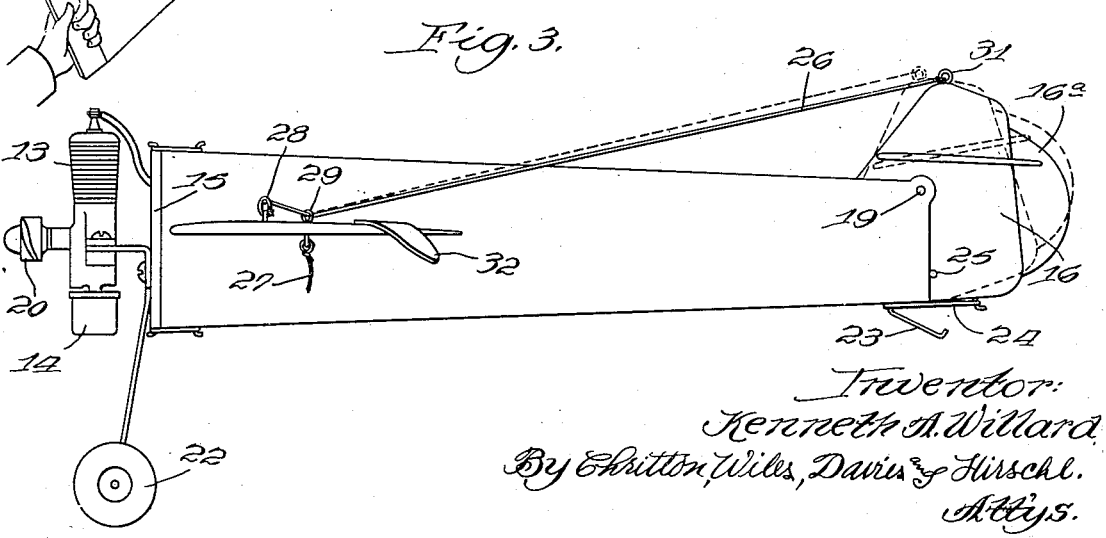

Patented July 6, 1943

2,323,506

UNITED STATES PATENT OFFICE 2,323,506

MINIATURE AIRPLANE

Kenneth A. Willard, East St. Louis, Ill., assignor to Comet Model Airplane & Supply Company, Incorporated, a corporation of Illinois Application February 9, 1942, Serial No. 430,105

7 Claims. (Cl. 46—77)

This invention relates to a miniature airplane and more particularly to means for controlling such an airplane in flight.

One feature of this invention is that it enables the airplane to be constrained to a desired course of flight; another feature of this invention is that the altitude of the airplane may be controlled during such flight; yet another feature of this invention is that the plane may be caused to perform various maneuvers while in flight, control being from one fixed or stationary point; a further feature of this invention is that it overcomes certain difficulties and objections heretofore found in previous attempts to achieve such control action; other features and advantages of this invention will be apparent from the following specification and the drawing, in which:

Figure 1 is a perspective view of one embodiment of this invention; Figure 2 is a partial top plan view of an airplane embodying this invention; and Figure 3 is a side elevational view of the airplane shown in Figure 2.

Miniature airplanes of various types have become very popular in recent years, the better of these airplanes employing small gasoline engines to drive them and having a considerable range of flight. Certain contests and flights are of what may be termed the free type, where the airplane is started off in a given direction and flies in that direction for as long as may be desired, the time usually being regulated by automatic timing mechanism shutting off the ignition, although sometimes these miniature airplanes are allowed to fly until their gasoline is exhausted. While this is of course the type of flight which is used where duration and altitude records are being sought, there are many occasions where it is desirable to fly the plane to tune it up to best performance, or to merely demonstrate its performance to someone, and in those and similar situations it is desirable to be able to control the flight of the airplane.

Heretofore certain attempts to control a miniature airplane in flight have been made, but these have all been open to certain objections and difficulties. One such method employed a single holding cord attached to a spar or strut extending forwardly of one wing, it being possible to cause the airplane to travel up or down by jerking the cord in an upward or downward direction. This is rather unsatisfactory, however, in that it tends to result in a jerky flight which is a series of dips. Another control method heretofore tried involves the use of two control cords operating on a lever arm, but the location of this lever arm is very critical. If the balance of the airplane is changed so that the pivot point of this lever is not near its center of gravity much difficulty is encountered with this form of control.

I have devised and am here disclosing a control arrangement which constrains the flight of the airplane to a desired course (a circular one if the operator stands in one place); which provides complete control of one movable control element of the miniature airplane as its elevators; and which is not critical in any way, yet which enables smooth and complete control of this movable control element of the airplane.

In the particular embodiment of this invention disclosed herewith a miniature airplane is shown having a fuselage 10, main wings 11 and 12, and a driving motor 13. This motor is here shown as of the miniature internal combustion type, its supply of gasoline being carried in the small container 14 beneath the motor, and ignition being provided by a battery and spark coil within the fuselage of the airplane, immediately behind the forward bulkhead 15 serving as a motor mounting. The back of the airplane is provided with an elevator and rudder assembly comprising the vertical rudder 16 and the horizontal elevators 17 and 18, this entire assembly being pivotal as a unit about the pin 19, as may be best seen in Figure 3. The miniature airplane is also provided, in accordance with conventional practice, with a propeller 20, an undercarriage comprising the landing wheels 21 and 22, and a tail skid 23.

The tail assembly comprising the rudder and elevator surfaces, as has been mentioned before, is mounted for pivotal movement about the pin 19. This movable control element or assembly is normally mounted in the position shown in solid lines in the figure by resilient means here shown as a rubber band 24, stop means, as the pin 25, being provided to prevent the resilient band from pulling the movable control element too far in one direction. Movement of the control element in the other direction, against the resistance of the resilient means 24, is effected by a control cord 26. As may be best seen in Figure 3, this control cord is shown as connected to an eyelet at the top of the movable control element; and whenever there is sufficient pull on the control cord to overcome the resistance of the resilient band 24 the movable tail assembly or control element is caused to swing about the pivot pin 19, as to the position shown in dotted lines.

When the cord 26 is referred to, it will be understood that the word cord is being used in a generic and broad sense. In the embodiments of this invention actually made by me this cord comprised a thread; but it will be understood that the word cord is intended to cover any long flexible element, even a wire or light cable.

In order to enable the miniature airplane to be constrained to the desired course by some means other than the control cord 26 I also provide a holding cord 27. As may be best seen in Figures 2 and 3, the holding cord 27 is immovably fastened to the wing 11 near its outer tip. The control cord 26, on the other hand, is movably fastened to the same wing, passing first through the eyelet 28 and then through the eyelet 29, where its direction is changed, and then back to the movable rear control assembly. I also provide a control member 30, here shown in the form of a hand grip element, adapted to have the adjacent ends of the two cords fastened thereto. That is, one end of the holding cord 27 is fastened to one end of the holding member 30 and the other end of the holding cord is immovably fastened to the outer end of the wing 11. One end of the control cord 26 is fastened to the other end of the holding member 30, and then the control cord extends through eyelets 28 and 29 on the wing 11 to have its other end fastened to the eyelet 31 at the top of the movable control element assembly. I find that it is also desirable to bend part of the vertical rudder 16 to one side, this being the part identified as 16a; and to provide a control element, as the aileron-like element 32, on the outer rear edge of the wing 11 to cause some lift there. The purpose of the portion 16a of the vertical elevator, of course, is to cause the miniature airplane to always tend to fly away from the spot where the operator is standing, so that there will always be considerable pull on the cords; and the purpose of the element 32 is to provide sufficient lift to overcome the dragging weight of the cords on this wing.

When an airplane embodying my control apparatus is to be flown it is only necessary to find a space providing a fairly large clear circular area. The operator may then stand in the middle of this space and start the airplane into flight. As the airplane gains speed and takes to the air it places more and more pull on the holding cords, and it is only necessary for the operator to move his wrist a little to control the flight of the airplane. That is, if the holding member is moved in one direction to relax the control cord and take all of the pull on the holding cord, the movable control assembly at the tail of the airplane will move to the position shown in solid lines in Figure 3, and the airplane will follow a slightly downward course. If it is desired to level the airplane off, it is only necessary to twist the wrist a little to put part of the pull of the plane on the control cord 26, any pull existing in this cord moving the control assembly away from the full line position; and if it is desired to cause the airplane to rise sharply, it is only necessary to relax the holding cord and place practically all of the pull on the control cord, this moving the tail assembly to a position which causes the airplane to zoom upwardly. It is apparent that very steady flight in a circle about the operator can be achieved, or that desired maneuvers of the plane can be effected, merely by varying the vertical position of the control member 30.

It will also be apparent that this control member need not necessarily be held in the hand, but that it could be mounted at the central point, it only being necessary that there be movement of the control member of such a kind as to cause more or less pull on the two cords.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for controlling a miniature airplane having a driving motor, wing and fuselage portions, and a movable control element, including: a holding cord fastened to one wing near the tip thereof; and a control cord movably attached to the same wing and fastened to said movable control element.

2. Apparatus of the character described for controlling a miniature airplane having a driving motor, wing and fuselage portions, and a movable control element, including: a holding cord fastened to one wing near the tip thereof; a control cord movably attached to the same wing and fastened to said movable control element of the airplane; and a control member separate from the airplane and having the other end of each of said cords fastened thereto at spaced points.

3. Apparatus of the character described, including: a miniature airplane having a driving motor, wing and fuselage portions, and a movable control element; resilient means for moving said control element in one direction; and a control cord having one end fastened to said control element and the other end adapted to be spaced a considerable distance from said airplane, the arrangement being such that pull on said control cord moves said control element in the other direction, against the urging of said resilient means.

4. Apparatus of the character described, including: a miniature airplane having a driving motor, wing and fuselage portions, and a movable control element; resilient means for moving said control element in one direction; a control cord having one end fastened to said control element and the other end adapted to be spaced a considerable distance from said airplane, the arrangement being such that pull on said control cord moves said control element in the other direction, against the urging of said resilient means; and a holding cord fastened at one end to an immovable part of the airplane, said holding cord being adapted to have its other end adjacent said other end of the control cord.

5. Apparatus of the character claimed in claim 4, wherein the holding cord is immovably fastened to one wing near the tip thereof and the control cord is movably attached to the same wing.

6. Apparatus of the character claimed in claim 4, including a control member separate from the airplane and having said other ends of the cords fastened thereto at spaced points.

7. Apparatus of the character claimed in claim 4, wherein said airplane is constrained to circular flight by one of said cords.

KENNETH A. WILLARD.